United States Patent Office 3,318,116
Patented May 9, 1967

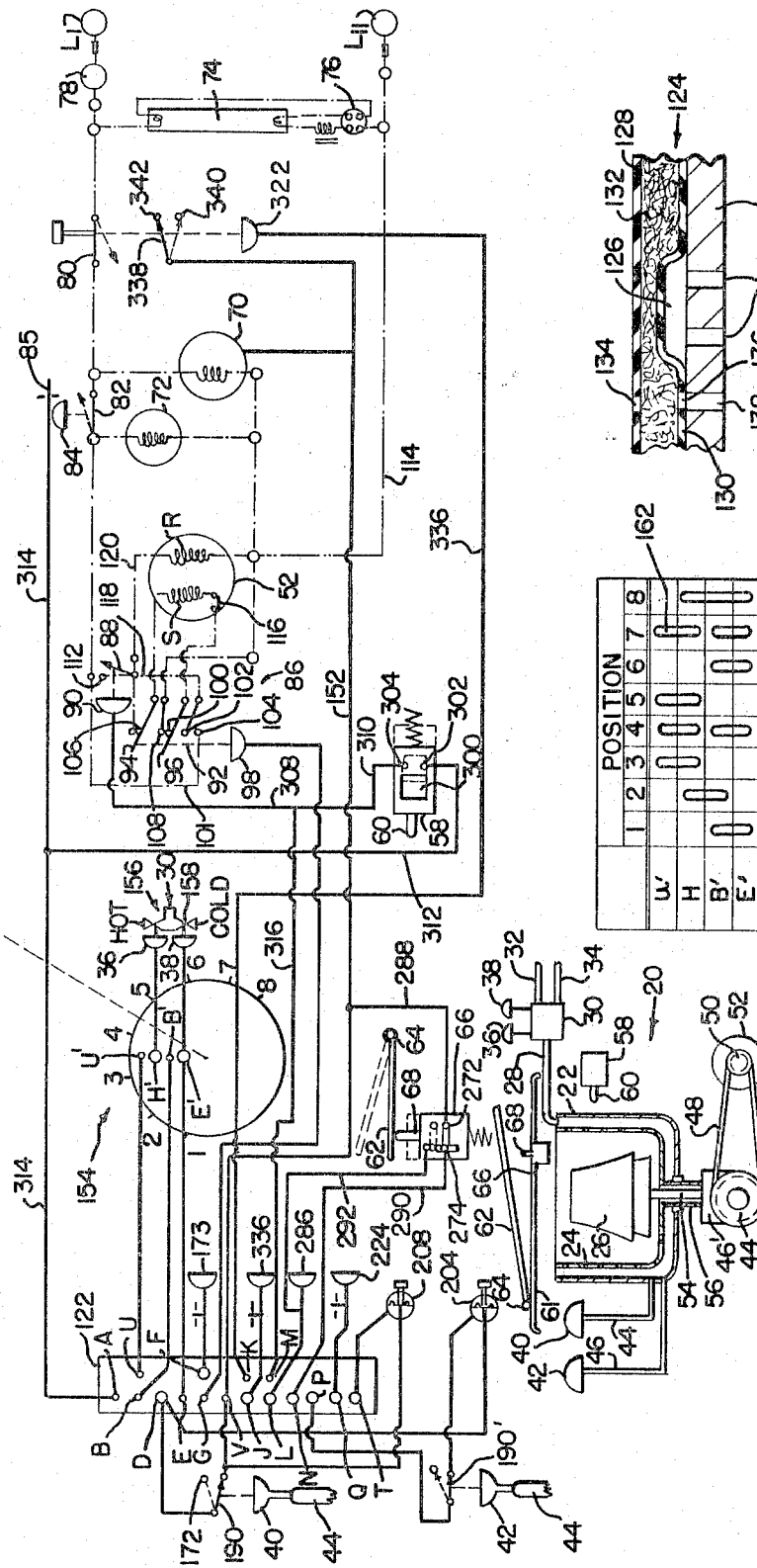

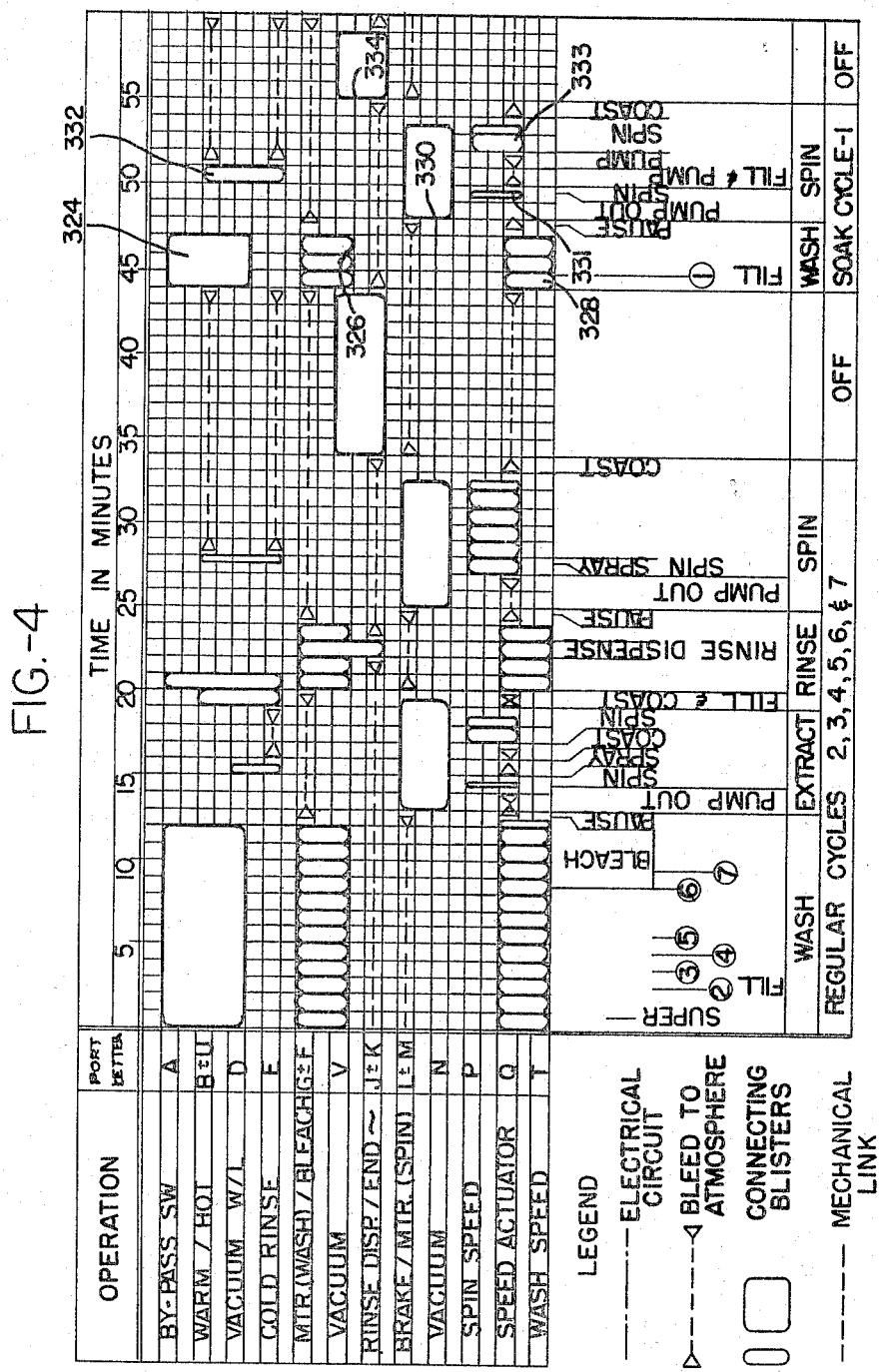

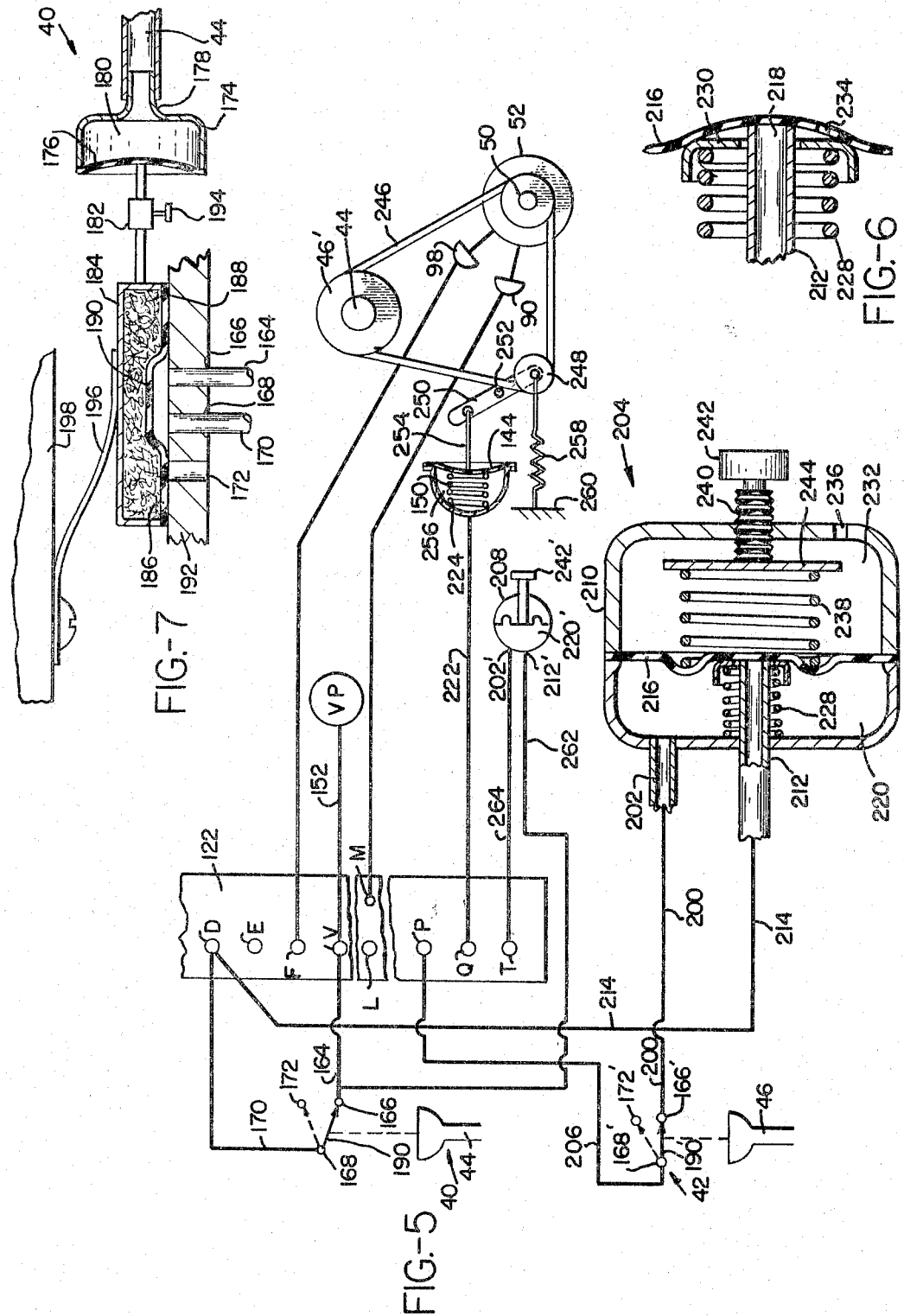

3,318,116
HIGH AND LOW LEVEL SPEED CONTROL FOR AN AUTOMATIC WASHING MACHINE
Roy W. Houser, Orange, and John B. Jaksha, Anaheim, Calif., assignors to Robertshaw Controls Company, Richmond, Va., a corporation of Delaware
Filed Oct. 24, 1965, Ser. No. 504,725
17 Claims. (Cl. 68—12)

This invention relates to a high and low level speed control for an automatic washing machine and the like.

One feature of this invention includes a speed control of the agitation and spin operations of an automatic washing machine.

Another feature of this invention includes a low level control of the speed of the spin operation to prevent increase in speed of the spin operation when the water level in tub of the washing machine has not been lowered below a safe limit.

Another feature of this invention includes a high water level control of the speed of the agitation operation of the washing machine.

Another feature of this invention includes the use of a vacuum system for controlling the operation of the washing machine, and in which the pressure of the vacuum may be adjusted to vary the speed of the agitation and of the spin action.

Other features of this invention are apparent from this description, from the appended claimed subject matter, and/or from the accompanying drawings, in which:

FIGURE 1 is a diagram showing a typical system embodying this invention.

FIGURE 2 is a chart showing the connections produced by the various positions of the selector disc.

FIGURE 3 is a typical diagrammatic cross section showing a reading head and a channeled control member passing over the reading head.

FIGURE 4 is a chart showing typical connections which are made by the channels of the channeled control member as it passes over the ports or openings of the reading head.

FIGURE 5 is a diagrammatic illustration of the combined water level and speed transmission control of this invention.

FIGURE 6 is an enlarged cross section of a portion of FIGURE 5.

FIGURE 7 is a diagrammatic cross section of the upper water level control member.

FIGURE 11 is a diagrammatic illustration of a typical automatic washing machine which embodies this invention.

Figure 8:
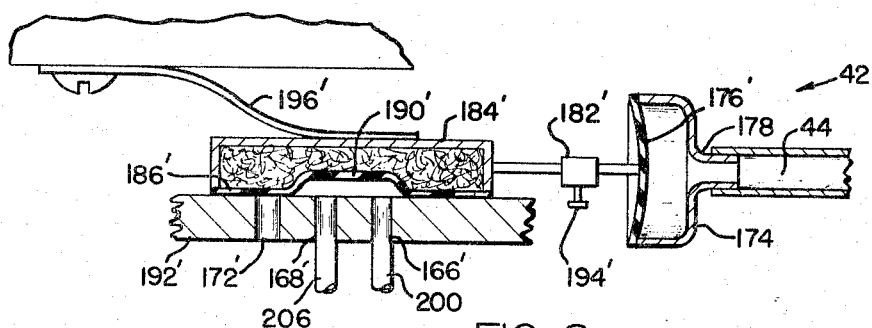
FIGURE 8 is a diagrammatic cross section of the lower water level control member.

Certain words are used herein in the specification and claims indicating direction, relative position and the like. These words are used for the sake of clearness and brevity. However, it is to be understood that these words are used in connection with the illustrations in the drawings only, and that in actual use, such parts that are so described may have entirely different direction, relative position, and the like. For example, such words are "upper," "lower," "vertical," "horizontal," and the like.

This invention is particularly adapted to control a washing machine by a combined pneumatic and electrical system. For example, the system may include the various parts, connections and operations diagrammatically disclosed in FIGURE 1, taken in combination with the other figures.

For example, the system of FIGURE 1 may control an automatic laundry machine 20, FIGURE 11, such as is generally known as an automatic washing machine. By way of example, such a machine may have a stationary tub 22, a centrifugal container, basket, or tub 24, which may be foraminous or non-foraminous, as is well known. The washing machine may also have an agitator 26, which may be oscillated in any well known manner, such as about a vertical axis, or up and down, or other motion well known in the washing machine art. Hot and cold water may be introduced into the tub 22 through the inlet pipe 28, under the control of a mixing valve 30 which is connected to the hot and cold water pipes 32 and 34 under the control of the pneumatic actuators 36 and 38 respectively to control the flow of hot and cold water from the pipes 32 and 34 into the supply pipe 28, and into the tub 22.

The supply of water may be also controlled by an upper water level control member or valve 40 and a lower water level control member or valve 42. These members 40 and 42 may be responsive to the water level in tub 22, and may be connected respectively by the pipes 44 and 46, for example, near the bottom of the tub 22.

The centrifugal basket or tub 24, and the agitator 26 may be respectively centrifugally rotated, and oscillated or reciprocated by a variable speed transmission 44, which may be driven by a pulley 46'. The pulley 46' may be a constant diameter pulley driven by a belt 48 from a smaller variable diameter pulley 50, which may be connected to a machine motor 52. Such transmission 44 is well known, and is not specifically illustrated. By way of example, it may be of the character that will reciprocate or oscillate the agitator 26, when the transmission or pulley 46 is rotated in one direction, to oscillate or reciprocate the agitator shaft 54. The transmission 44 or pulley 46' may be rotated in the other direction centrifugally to rotate the basket or tub 24 by rotating the tub supporting shaft 56.

All of the foregoing components described in connection with the washing machine 20 are individually known, and therefore are not further illustrated specifically, except as will be further described.

The stationary tub 22, and its contents, as well as the transmission 44 and motor 52 are generally supported on a resilient mounting, not shown, so that they may yield to the centrifugal forces created when the centrifugal basket or tub 24 is rotated. Such support is well known. An unbalance valve 58 may be supported by the cabinet of the washing machine so that the plunger 60 will be struck and pushed inwardly by the tub 22 when the tub oscillates too far from its usual vibration. This will cause the unbalance valve 58 to operate, as elsewhere herein disclosed.

The cabinet of the washing machine, a portion of which is indicated at 61, and which encloses the tub 22, and its contents, as well as the transmission 44 and motor 52 may be provided with a lid 62 which may be hinged at 64. A lid valve 66, supported in the cabinet, may have a plunger 68, which plunger is pushed down, when the lid 62 is closed. The plunger 68 is allowed to raise, when the lid 62 is opened. This causes the lid valve 66 to operate in a manner elsewhere herein disclosed.

In FIGURE 1, an electrical system is shown in dot and dash lines for the purpose of energizing and controlling the washing machine motor 52, a vacuum pump and motor unit 70, a timer motor 72 and illuminating light 74. The light 74 may be a fluorescent light, under the control of the light switch 76, and which has the usual starting circuit which is diagrammatically illustrated in FIGURE 1.

The electrical circuit may be traced from line L' through a safety fuse 78, through a manual master switch 80, which is closed when it is pulled out, or upwardly, in FIGURE 1. The circuit then passes through a bypass switch 82, which is closed when there is no vacuum in the vacuum actuator 84, and is opened when there is a vacuum in the actuator 84.

The circuit then goes to the reversing motor controller 86 for motor 52. The motor reversing controller 86 may be of any well known construction. It causes the motor 52 to rotate in one direction when one switch 88 is actuated, and causes the motor 52 to rotate in the other direction when the switch 92 is actuated. For example, the motor reversing controller 86 has a spin switch 88 which is closed when the spin vacuum actuator 90 has a vacuum created in it, and is opened when the vacuum is broken, and atmospheric pressure is introduced in the actuator 90. The switch 88 is shown in open position in full line, and will be moved leftwardly to the dotted line position when a vacuum is created in actuator 90. The motor controller 86 also has an agitation or wash control switch 92 which has its two arms 94 and 96 pulled down when actuated by the agitation vacuum actuator 98 when there is a vacuum in the actuator 98. These arms 94 and 96 are in their upper unactuated position, as shown in FIGURE 1, when there is no vacuum in the actuator 98. When a vacuum is created in actuator 98 to actuate switch 92, the arms 94, 96 are pulled down, so that the contacts 100, 102 and 104 are brought together against the contact 104. At the same time, the contact 106 is brought down against the contact 108. However, if there is no vacuum in the actuator 98, then the contacts 100, 102, 104, 106 and 108 are in the positions illustrated in FIGURE 1.

The machine motor 52 is a reversible motor, and may have a running winding R, and a starting winding S. It will be evident to those skilled in the motor art, that with no vacuum in actuators 90 and 98 and with the switch 88 open, and with switch 92 in its full line position, no current will flow through the motor 52, since the only line contacts 104 and 112 of the controller are open, and no current can flow from L' past them to the motor 52.

However, if the switch 88 is closed on its contact 112 by vacuum in actuator 90, then current will flow from L' to the switch 88 and through line 120 to the running winding R and through the return line 114 to the power source L". At the same time current will flow from the contact 112 through the switch 88 through the contacts 106, blade 94, starting winding S, centrifugal switch 116, blade 96, contacts 100 and 108 and then to the return line 114. The starting winding S, when so energized, will cause the motor 52 to rotate in the spin direction to rotate the tub 24.

To reverse the motor 52 to cause it to drive the agitator 26 the agitation actuator 98 has a vacuum created in it to actuate the agitation switch 92. At the same time, the switch 88 is open by lack of vacuum in actuator 90. The switch 92 is pulled down by vacuum in the actuator 98, and agitation direction of rotation is established in the motor 52. Current will flow from L' through the line 101 to contact 104 and through the contact 102 which is down, and from therethrough the line 118 and line 120 to the running winding R and from thence to the return line 114 and to L". At the same time current flows from the line 101 to the pulled down contact 104 and through the pulled down contacts 102 and 100, and pulled down blade 96 through the centrifugal switch 116, and upwardly through the starting winding S and from thence through the pulled down blade 94 and stationary contact 108, to the return line 114, and L".

It is therefore to be seen that when the vacuum actuator 90 is subjected to a vacuum, the switch 88 is closed, and the motor 52 is caused to rotate in one direction (spin direction) of rotation which is in the direction to cause the transmission 44 to operate the spin action of the basket or tub 24. In this position, the current is directed in one direction through the starting winding downwardly according to the description previously given. On the other hand, when vacuum is broken in the vacuum actuator 90 so that it is subjected to atmospheric pressure to open switch 88, and the agitation vacuum actuator 98 is subjected to a vacuum, to pull the switch blades 94 and 96 down, then the machine motor 52 is rotated in the opposite direction (agitation direction), which causes the transmission 44 to operate the agitator 26, to produce a washing action.

The bypass switch 82 is such that when it is pulled to open position by a vacuum in actuator 84, then current can flow through the vacuum pump and motor 70 but cannot pass through the timer motor 72, or the machine motor 52.

The bypass vacuum actuator 84 is subjected to a vacuum by a construction herein elsewhere described, to stop operation of a main motor 52 and the timer motor 72 while the tub 22 is being filled and also to prevent the agitator 26 from being operated when the tub is not filled. However, the vacuum pump 70 is operated to produce a vacuum supply for a vacuum control system as may elsewhere be needed.

The bypass actuator 84 may be provided with a metered orifice 85 to permit a slow feed of atmospheric air into the actuator 84 when the vacuum pump 70 is disconnected from the actuator 84.

Similar metered orifices are indicated elsewhere in FIGURE 1 to indicate a similar slow atmospheric feed for the same purpose at the places indicated by a similar symbol.

The vacuum system may include a reading head 122 which has vacuum and atmosphere transferring openings hereafter identified and over which a flexible, channeled control member 124, FIGURE 3, may pass. The control member 124 has a series of channels 126, which channels pass over the openings illustrated on reading head 122 of FIGURE 1 to produce a vacuum transfer between such openings, or an atmospheric air transfer through such openings as may be desired. If desired, the channel member 124 may have an outer plastic sheet 128, FIGURE 3, an inner plastic sheet 130 and an intermediate porous flexible layer 132 which may be made of porous rubber or the like. The sheets 128 and 130 may be provided with openings 134 and 136, which need not be exactly opposite each other, so that atmospheric air may enter the opening 134 to be filtered by the porous layer 124, and pass through the opening 136, into the reading head opening 138, which may be emblematic of any of the openings as hereinafter described in connection with FIGURE 1. The reading head may also have other openings shown in FIGURE 3, such as 140 which also may be emblematic of any of the openings hereinafter described in connection with FIGURE 1 and which may be variously bridged or connected by various channels 126 in the control member 124.

Figure 10:
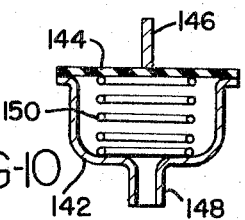
FIGURE 10 is an enlarged diagrammatic cross section of a typical vacuum actuator of the type indicated in FIGURE 1.

In FIGURE 1, the reading head 122 has a channeled control member pass over it of the character indicated in FIGURE 3, which causes its channels 126 and openings 136 to pass over the various openings indicated by capital letters in FIGURE 1. The openings in the reading head 122 of FIGURE 1 are indicated by the capital letters A, B, U, D, E, F, G, V, K, J, L, M, N, P, Q and T. These openings of the reading head 122 of FIGURE 1 are connected by vacuum or atmospheric air transmitting tubes or lines which are indicated by heavy diagrammatic lines. These lines are connected to various members, including vacuum actuators of the type indicated in FIGURE 10. Such actuators may have a rigid cup or the like 142, a flexible diaphragm 144 and an actuating connecting rod 146 to actuate any desired member on the washing machine. The cup 142 may be connected by the connector tube 148 with the various vacuum or air lines shown in FIGURE 1. If desired, a compression spring 150 may be placed in cup 142, which causes the diaphragm 144 to move upwardly, in FIGURE 10, when the vacuum in the cup 142 is broken by introduction of atmospheric air into the cup. When a vacuum is created in the cup 142, the diaphragm 144 is moved inwardly into the cup, and moves the rod 146 with it. Such actuators may be of the type disclosed in the patent to H. W. Rice, 3,142,966, granted Aug. 4, 1964, the actuator being indicated by reference numeral 14 in such patent.

Referring again to FIGURE 1, the vacuum pump 70 creates a vacuum condition in the reading head opening V through the pipe 152 whenever the pump 70 is operated. The other openings of the reading head 122 of FIGURE 1 are connected to various components by various tubes which are disclosed elsewhere.

A selector valve construction 154 may be provided for selecting any of a plurality of programs to be performed by the washing machine. Such construction 154 may be a stationary disc like construction which has openings U', H, B' and E'. The openings U', B' and E' are connected respectively with the openings U, B and E of the reading head 122 by tubes, as shown in FIGURE 1. The opening H is connected to the hot water vacuum actuator 36 which actuates the hot water valve 156 of the mixer 30. The opening E' is connected to the cold water vacuum actuator 38 which actuates the cold water valve 158 of the mixer 30. A plurality of indicating selector positions 1, 2, 3, 4, 5, 6, 7, 8, for example, may be placed around or adjacent the disc 154.

A rotatable selector disc 160 may be mounted to be rotatable over the stationary disc 154. The disc 160 may have a flexible channeled member, somewhat similar to the member 130 of FIGURE 3. The rotatable disc 160 may have a membrane or film with channels or blisters 162, similar to channels 126 of FIGURE 3, located thereon which bridge the openings U', H, B' and E' of the member 154 in accordance with the chart of FIGURE 2, wherein the various connections made by the blisters 162 are indicated for each position of the indicator 161 of disc 160 over the positions 1-8 of the disc 154. By way of example, in position No. 1, FIGURE 2, the rotatable disc 160 will have a blister 162 connecting openings B' and E', so that a vacuum will be created in actuator 38 at the proper time and only cold water will be added to the tub 22 when one or more channels 126 bridge the reader head openings B, D, as the timer control member 124 is moved over the reading head 122. The opening D will have a vacuum produced in it at the proper time as elsewhere described. It is thus to be seen, that by turning the rotatable disc 160, it is possible to select which one of the water valves 156 or 158 are to be opened at various times during the passing of the control member 124 over the reading head 122. The passage of the control member 124 over the reading head will produce the selected program.

Other connections from the reading head 122 include connections from the openings D and V to the upper water level control 40, which control is also shown in FIGURE 7. The line or tube 164, FIGURE 5 connects the reader port V with the opening 166 of the upper water level valve 40. The opening 168 of valve 40 is connected to line 170 which line is also connected to reader head port D. The valve opening 172 is connected to the atmosphere. The port F is connected to a bleach actuator 173 which actuates a bleach dispenser when a vacuum is produced in the actuator 173 by the line connecting it with port F.

FIGURE 7 shows diagrammatically the upper water level control member or valve 40. For example, the water control member 40 may have a cup or casing 174 which has connected thereto a flexible diaphragm 176 at its upper part. The casing 174 has a fluid inlet and outlet 178 at its lower end which may be connected to the pipe or conduit 44, which is connected to the lower part of the tub 22 of the washing machine. A pressure chamber 180 is thus formed, which is responsive or proportional to the water level in the tub 22. The diaphragm 176 moves up and down in its central part in response to the level of the water in the tub 22. Such diaphragm 176 is connected to a snap acting mechanism 182, which is well known, and which may be connected to a movable member or carrier 184 which may be cup like in its construction and which has a flexible film or membrane 186 which may be secured to the rim of the cup 184. A porous member or body 188 may be placed between the membrane 186 and the cup 184. A permanent channel 190 is formed in the film or membrane 186, which channel 190 may be, in general, of the same construction as channel 126, previously described. The carrier 184 may be held against a stationary plate or reading head 192, which has the openings 166, 168 and 172 passing through the reading head 192. The snap acting mechanism 182 holds the carrier 186 in its lower position, as illustrated in FIGURE 7, when the water level in the tub 22 is below a selected upper level or filled level of the tub 22. However, when the water level in the tub 22 rises to the selected upper level, then the increased pressure in chamber 180 causes the snap acting mechanism 182 under the pressure of the diaphragm 176 to snap the carrier 186 to the upper position, where the channel 190 will bridge the openings 170 and 172, instead of the openings 166 and 168, which it previously bridged. The snap acting mechanism 182 may be manually adjustable at 194, so that it can be adjusted to produce the snap action at various selected upper or "filled" levels desired in the tub 22.

If desired, a leaf spring or blade 196 may be supported on a fixed member 198, and its free end may push the carrier 186 against the reading head 192 to maintain a sufficiently tight sealing action between the membrane 186 and the reading head 192.

It is therefore to be seen that when the tub 22 is not filled to the desired upper or "filled" level, then the openings 166 and 168 are bridged by the channel 190. However, when the tub 22 has been filled to the desired level, then the openings 172 and 168 are bridged by the channel 190. Therefore, the reader opening V, FIGURE 5, is connected to the reader opening D when the tub is filled, and a vacuum is produced in the opening D through pipe 170 under these conditions. However, when the tub is "filled" to the desired level, the openings 168 and 172 are bridged by the channel 190 and atmospheric air from opening 172 is allowed to enter into the opening D through channel 190 and line 170 and the vacuum in opening D is broken and maintained broken as long as the tub is filled. Therefore the water control actuators 36 and 38 cannot have a vacuum created in them from opening D when the tub 22 is filled. However, they can have a vacuum created in them when the tub 22 is not "filled."

The low level control valve 42 is connected by the tube 46 with the bottom of the tub 22, and is responsive to a predetermined low level of the water in the tub 22. Such low level valve 42 is diagrammatically shown in FIGURE 8. In general, the low level control member 42 is structurally the same as the member 40, which is shown in FIGURE 7, and the various members are substantially the same. Some of the characters of FIGURE 7 have been repeated in FIGURE 8, with the prime mark (') after the reference character, and it is to be understood that all of these parts operate substantially in the same manner, but at a different pressure. However, the pipe connections in FIGURE 8 correspond to the pipe connections in FIGURE 5.

In FIGURES 5 and 8, the lower level valve 42 is provided with an opening 166' which is connected to the tube or line 200 which is connected to the opening 202 in the spin speed regulator 204, the operation of which is elsewhere more fully described. Another opening 168' is connected to the tube or line 206, which is connected to the opening P in the reading head 122. The opening 172' is open to the atmosphere.

The lower level valve 42 connects the openings 166' and 168' when the level of the water in the tub 22 is below a selected or critical low level. The valve 42 connects the openings 166' and 172' when the level of the water in the tub 22 is above such selected low level.

The selected low level to which valve 42 is responsive can be adjusted by the adjustment member which may be a knob, lever, or the like 194' which adjusts the snap acting mechanism 182' in the same manner as previously described in connection with the valve 40.

An agitation speed regulator 208 may have a construction substantially identical with that disclosed in connection with spin speed regulator 204, and is therefore illustrated in much smaller scale to avoid repetition.

The spin speed regulator 204 (and the regulator 208) has a casing 210 which is provided with openings 202 and 212. The opening 212 is connected by the line or tube 214 with the reader head opening D.

The construction of the speed regulator 204 is somewhat similar to that disclosed in the patent to H. W. Rice 3,142,966. In general, the diaphragm 216 covers and uncovers the end 218 of the stationary pipe 212 to permit the suction action at the end 218 to maintain a regulated vacuum pressure in the chamber 220. This regulated vacuum pressure in chamber 220 is transmitted through the pipe 202 and through the lines 200, 206 to the reader opening P. However, this vacuum pressure can only be transmitted when the water level in the tub 22 is below the low level to which the valve 42 is responsive, and when the channel 190' bridges the openings 166' and 168'. When the channel 190' bridges the openings 166' and 172', the vacuum at opening P is broken, and atmospheric pressure is transmitted from atmospheric opening 172' to opening P.

The timer member or membrane 124 at the proper time can bridge the openings P and Q of the reader 122 and thus transmit this regulated vacuum pressure through the line 222 to the speed regulating actuator 224. The amount of vacuum created in the actuator 224 will vary the diameter of the pulley 50, to regulate the speed of transmission in the transmission 44, to regulate the speed of spin of the basket 24 of the washing machine. The construction is such that the speed of a spin of basket 24 cannot be increased unless the level of the water in the tub 22 has been lowered by drainage or pumping action, so that such level is below that selected by the low level valve 42. That is, the speed regulator 204 cannot increase the speed of spin through the transmission 44 unless the openings 166' and 168' are joined by the channel 190', which cannot take place unless the water level in the tub 22 has been lowered below the selected level established by the valve 42. Also, the vacuum cannot be transmitted to the speed control actuator 224 through line 222 unless the upper level controller 40 has moved the channel 190 to join the openings 166 and 168, due to the low level in the tub 22, so that a vacuum can flow from the port V through the line 164, channel 190, line 170, opening D, line 214, tube 212, and end of tube 218 to regulate and maintain a vacuum in vacuum pressure chamber 220.

Therefore, the construction of the water level valves 40 and 42 provide the safety feature that no increase in speed of the spin of the basket 24 can take place unless the water level in the tub 22 has been lowered below the selected low level established by the valve 42.

The action of the pressure regulator 204 may be briefly described as follows. A compression spring 228 surrounds the pipe 212 and has its upper end engaging a flat bottomed cup 230. The spring 228 tends to push the cup upward, to uncover the end 218 and subject the chamber 220 to the suction action of the vacuum pump through the tube 212. When this suction action has reduced the vacuum 220 below the desired pressure, the atmospheric pressure in the chamber 232 pushes the diaphragm 216 leftwardly and this causes the diaphragm 216 to be flexed as shown in FIGURE 6, so as to uncover the opening 234 in diaphragm 216 to allow a small amount of atmospheric air to enter the chamber 220 to maintain the desired vacuum pressure in the chamber 220. The atmopheric pressure in the chamber 232 is established by the opening 236 which is open to the atmosphere.

The atmospheric pressure in chamber 232 is further reinforced by the compression spring 238, which increases the atmospheric pressure in 232 to push the diaphragm 216 leftwardly when the vacuum in chamber 220 has been reduced below the desired vacuum. This spring 238 may have its compression load adjusted by the screw 240, which can be turned by the knob 242 to move the disc 244 rightwardly and leftwardly, and thus adjust the total pressure which is established against the diaphragm 216. This adjustment at knob 242 therefore establishes the selected vacuum pressure which is to be maintained in the regulated pressure chamber 220. This regulated vacuum will be transmitted to the speed regulating actuator 224, and therefore the desired speed of spinning of the basket 24 is established by regulation at the knob 242.

Figure 9:
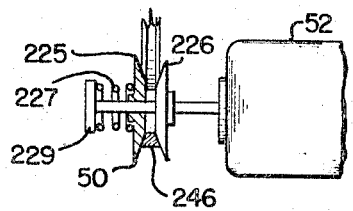
FIGURE 9 is a transverse cross section of the variable effective diameter drive pulley of the variable speed transmission.

The speed regulation of the transmission 44 may be accomplished by any desired adjustable speed transmission which can be regulated by an actuator such as 224. As illustrated in FIGURES 5 and 9 the motor 52 is provided with an adjustable diameter pulley 226 around which the belt 246 passes and engages the constant diameter pulley 46'. The belt 246 may be a V-belt and may also pass over the idler pulley 248. The idler pulley 248 may be carried by a lever 250 which has a fulcrum at 252, and has its other end connected by the rod 254 with the diaphragm 144 of the actuator 224. When a greater suction is produced in the chamber 256 of the actuator 224, the rod 250 is rocked counterclockwise, so that the idler pulley 248 is moved toward the pulley 226 and allows the V-belt 226 to move outwardly in the pulley 226. This increases the diameter of the pulley 226, and therefore increases the speed of rotation of the pulley 46', as the suction strength in chamber 256 becomes greater. A tension spring 258 is attached to the shaft of the pulley 248 or to lower end of lever 250 and has its other end connected to any fixed member 260, to maintain proper tension on the V-belt 246. Either spring 150 or spring 258 may be omitted, if the strength of the remaining spring 150 or 258 is sufficient to maintain an operating tension on the belt 246.

The pulley 50 may be of well known construction in which a pulley flange 225 is axially movable on the shaft of the motor 52, FIGURE 9. The pulley flange 226 is axially fixed on the shaft of the motor. A compression spring 227 has one end engaging the fixed nut 229 on the motor shaft and has the other end axially pushing the pulley flange 225. This causes the pulley 50 to have an automatically variable effective diameter as the speed regulating actuator 224 rocks the lever 250 to pull the belt 246 inward or outward in the pulley 50.

The agitation speed regulator 208 has its opening 212', which corresponds to opening 212, connected by the pipe 262 with the vacuum pipe 164. It also has its opening 202' connected by the pipe 264 to the reader opening T. Therefore, whenever the reader openings Q and T are bridged by the timer, a regulated vacuum will be established in the speed control actuator 224 in response to the vacuum pressures maintained in the chamber 220' of the agitation regulator 203. As is obvious, a greater suction pressure in the chamber 220', as established by the knob 242', creates a faster speed transmission at 44 in the same manner previously described in connection with the spin regulator 204.

A lid valve 66 is provided to cause the application of a brake to the spinning basket 24 may be provided, which applies the brake to the basket 24 practically as soon as the lid 62 of the washing machine is lifted. This may be accomplished by providing the lid valve 66 with a stationary reading head 270, FIGURES 12 and 13, having openings 272 and 274 at the same level and openings 276 and 278 at different levels. A movable connector member 280 is movable up and down against the stationary reading head 270. The member 280 may have a film or membrane 282 which has a T shaped channel construction 284 which is movable up and down past the openings 272, 274, 276 and 278. When the lid and member 280 are down, the openings 272 and 274 are bridged by the channel 284. When the lid is moved up, the member 280 moves up, so that the channel member 284, which is T shaped, bridges the openings 274, 276 and 278, and closes the opening 272, as shown in FIGURE 12.

When the spin operation is to be performed and is controlled by the timer flexible control member 124, the reading head openings L, M and N are bridged by a channel construction 126 of the timer control member so that a vacuum can be applied to the brake actuator 286. The brake actuator 286 will remove the brake action on the rotatable tub 24 when a vacuum is established in such actuator 286. The motor 52 can then drive the tub 24 at centrifugal speed.

Therefore, when the lid is down, a vacuum is transmitted from the line 152 through the line 288, opening 272, channel 284, opening 274, line 290, then to reader opening N which can then be bridged to the opening L, to produce a vacuum in the actuator 286. This vacuum in actuator 286 moves the brake away from the basket 24, so the basket can be rotated. At this time the line 292 is closed at atmospheric opening 278 by the film 282, so that atmospheric pressure air cannot reach actuator 286 and so that a vacuum can be maintained on the actuator 286. Therefore, the spin operation can be produced by other lines, without having the brake applied to the basket.

Figure 12:
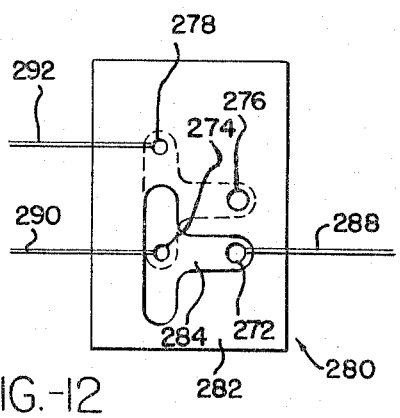
FIGURE 12 is an enlarged side view of the lid valve.
Figure 13:
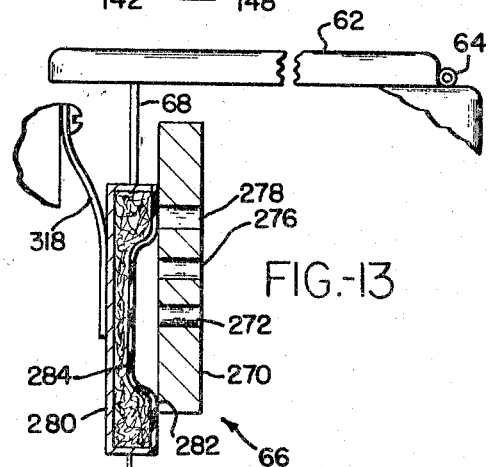
FIGURE 13 is an enlarged cross section of the lid valve.

However, when the lid 62 is lifted, and the movable member 280 is moved upwardly, so that the T shaped channel 284 bridges the openings 274, 276 and 278, as shown in dotted lines in FIGURE 12, atmospheric air can flow from the atmospheric opening 276, through the channel 284 which is now up, and through the opening 278 and line 292 to the brake actuator 286, which applies the brake when atmospheric air is applied to the actuator 286. Atmospheric air can also pass through channel 284 to opening 274 and line 290. This insures a quick stopping of the basket 24 if the lid 62 should be opened when the basket is being spun. The basket is stopped by the brake regardless of whether the motor 52 is energized or not, since the brake is more powerful than the motor. If necessary, a slip clutch is provided between the motor 52 and the basket 24.

Figure 14:
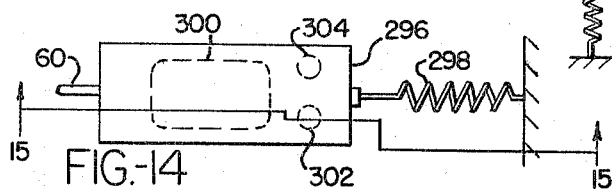
FIGURE 14 is an enlarged plan view of the unbalance valve construction.
Figure 15:
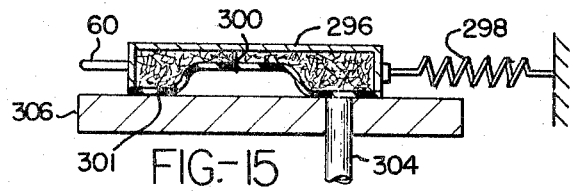
FIGURE 15 is a cross section along the line 15—15 of FIGURE 14.

If the laundry in tub 24 should be unduly unbalanced so that violent vibrations are produced in the tubs 22 and 24, and the unbalance plunger 60, FIGURES 14 and 15, is struck by the vibrating tub 22. The plunger 60 is rigidly held by body 296. This causes the body 296 to be moved against the load of compression spring 298 and to be moved rightwardly in FIGURES 14 and 15 to cause the large cavity 300 in the flexible film or membrane 301 to be moved over the openings 302 and 304 in the stationary reading head 306. If the unbalanced swinging action continues, the cavity 300 is held over the openings 302 and 304 substantially continuously by the repeated vibrations to transfer the vacuum which was flowing through the line 308 to the spin actuator 90 through the line 310, opening 304, cavity 300, opening 302, line 312, and line 314, to produce a vacuum in actuator 84 and open the bypass switch 82 thus deenergizing the motor 52 and the timer motor 72. The machine will therefore be stopped for lack of power.

The cavity 300 is sufficiently large to hold the body 296 stationary over the openings 302, 304 when the tub stops and does not engage the plunger 60. The timer channels were bridging openings L and N during the spin operation so that a vacuum is maintained in cavity 300 in spite of the slow leak at orifice 85. This maintains the bypass switch 82 open and the machine motor 52 and timer motor 72 deenergized.

However, if the lid 62 is opened to investigate why the machine has stopped, atmospheric air will be supplied from the openings 276 and 278 of the lid valve 66. Atmospheric air can then flow through line 292 to reader head opening L, which was connected with reader opening M to produce the spin at the time the machine was stopped. Therefore the atmospheric air will then flow through the line 316, and line 310 to fill the cavity 300, and allow the body 296 to be pushed leftwardly by the spring 298. The opening of the lid therefore resets the unbalance valve 58, after such valve 58 has been displaced by the unbalanced load.

In all of these sliding members with films and cavities, a spring blade may be provided, as has been illustrated, but not necessarily described. For example, these additional spring blades may be supplied at 318 in FIGURE 13.

In all of the embodiments the film or membrane which is adjacent a reading head may be made of thin plastic sheet material that can bend to adjust itself hermetically against the reading head surface adjacent a vacuum opening. The closed end channels formed in the film or membrane are self-sustaining and do not collapse under the pressure differential between the vacuum pressure and atmospheric pressure.

FIGURE 4 is a chart showing what reader openings are bridged as the timer control member 124 is moved leftwardly in FIGURE 4 over the reader 122. The control member 124 may be in the form of a belt which is rotated with one run passing over the reader 122. Alternatively, the control member 124 may be a disc which is rotated about an axis which is perpendicular to the reader 122 and in which radii of the disc continually pass over the reader 122.

For example, the selector disc 160 may be placed at position 1 and the master switch 80 may be pulled out to ON position. Switch 80 remains in ON or OUT position until a vacuum is produced in OFF actuator 322. Actuator 322 will pull switch 80 to OFF or open position when vacuum is produced in actuator 322 at the end of the selected program. The timer control member 124 is automatically or manually advanced leftwardly over the reader 122 until position 1 is reached on the chart of FIGURE 4 substantially at the 45 minute mark. This causes the blisters shown in FIGURE 4 to produce the following bridging actions: Ports A, B, D and U are bridged by blister 324. Ports G, V, and F are bridged by blisters 326. Ports Q, T are bridged by ports 328. Ports J and K are vented to the atmosphere by openings in timer member 124 similar to 138 in FIGURE 3.

Blister 324 may be a large continuous blister and groups of blisters 326 and 328 are close parallel narrow channels that produce a substantially constant bridging action as they pass the reader openings.

At the above start of Selection 1, the vacuum pump 70 is energized by the manual closing of switch 80. However, the timer motor 70 and the machine motor 52 do not operate, since they are "bypassed" by the opening of bypass switch 82 by a vacuum which is produced in actuator 84. This vacuum is produced when the vacuum pump 70 produces a vacuum in line 152 and port V. The port V is connected to port D by water level valve channel 190 which connects the openings 166 and 168 and line 170 to D. Port D is connected to port A by blister 324 which then produces a vacuum through line 314 to bypass actuator 84 to open bypass switch 82. This arrests operation of timer motor 72 and machine motor 52 while the machine tub 22 is being filled with cold water by the production of a vacuum in port B by blister 324. Port B produces a vacuum in port B' which is now connected only to port E' by selector valve disc 160 in "position 1." Therefore only port E' has a vacuum produced in it and energizes the cold water actuator 38 and cold water valve 158 to fill the tub 22 to the desired level with cold water before the timer motor 72 and machine motor 52 can start.

The bridging of ports V, G and F by blisters 326 causes the motor reversing switch 86 to be placed in agitation rotation position by producing a vacuum in agitation actuator 98. However no agitation can be produced while the tub 22 is being filled as the water level valve 40 has "bypassed" the motor 52 to prevent such motor 52 from operating until the tub 22 is filled with cold water.

When the tub 22 is filled with cold water, the upper water level valve 40 responds by moving the channel 190 upward to join openings 168 and 172 to introduce atmospheric air pressure into opening D. The blister 324 then transfers the atmospheric air pressure to reader openings B, A and U. This atmospheric pressure goes to E' through selector valves 154, 160 as previously described and produces atmospheric air pressure in cold water actuator 38 to close cold water valve 158 and stop the filling action. At the same time the atmospheric air pressure is transferred to reader opening A which then sends such air pressure to bypass actuator 84 to close bypass switch 82 and to energize the timer motor 72 and machine motor 52. The timer motor 72 will then advance the timer control member 124 and the machine motor 52 will drive the agitator 26 at the selected speed, as selected by speed control 208. The speed control 208 establishes the vacuum pressure which will be transferred to agitation actuator 224 and hence the speed of the belt 246.

The laundry is then given a two minute cold water wash from about the 45 minute mark on the chart of FIGURE 4 to the 47 minute mark. The tub 22 is prevented from spinning during this time since the brake actuator opening L and spin actuator opening M are vented to the atmosphere by suitable openings in the controller 124, as indicated by the atmospheric bleed legend on the chart of FIGURE 4.

After the two minute cold wash, there is a one minute pause from the 47 to the 48 minute mark.

Then a spin operation is started at the 48 minute mark when the blister 330 bridges reader spin openings L, M and N and the reader agitation openings G and F are vented to the atmosphere.

The bridging of spin openings L, M and N causes a vacuum to be supplied to the brake actuator 286 to release the brake from centrifugal tub 24. The vacuum comes from main vacuum line 152, line 288, door switch 66, line 290, opening N, blister 330, reader opening L and brake actuator 286. Spin agitator 90 has a vacuum supplied from reader opening M, lines 316 and 308 to cause spin at lowest speed. This pumps out the main water from tubs 22 and 24.

The spin speed cannot be increased during this time because opening P and Q are not bridged together to supply a vacuum to the speed control actuator 224.

When the timer controller passes the 49 minute mark, the blister 331 bridges the reader openings P and Q. This will supply a regulated vacuum to the speed control actuator 224. The speed vacuum regulator 204 will supply the selected vacuum pressure to the reader opening P provided the water in the tub 22 has been pumped out to a sufficiently low level to cause the lower level valve 42 to snap the channel 190' down to bridge the openings 166' and 168'. When this happens, the speed control actuator 224 may have regulated vacuum supplied to it from spin regulator 204 to increase the spinning speed. However, the low level valve 42 will permit this increased speed only if the water in the tub 22 has been pumped down below the critical low level.

At the 50 minute mark the spin speed is reduced to its lowest value by the bleeding of atmospheric air into reader opening Q as indicated on the chart. This may be done by having openings similar to 136 of FIGURE 3 pass over the reader opening Q. This supplies atmospheric air pressure to the speed control actuator 224 and reduces the speed of transmission of the belt 246.

Then at the 50 minutes mark a fill and pump rinse may be sprayed into the centrifugal tub 24 during the slower rotation of the tub 24 by the blister 332 which bridges openings B, U, D and E to supply cold water into the tub 24. This spray may continue for one minute, after which the openings B, U, and E are vented to the atmosphere as indicated on the chart to stop any further addition of cold water.

At the 52 minute mark, the blisters 333 may bridge the reader openings P and Q to increase the speed of the spin, as previously described, and subject to the control of the low level valve 42 which prevents high speed spin if the tub 22 has not been emptied to a sufficiently low level.

At the 53½ minute mark the blisters 330 and 333 terminate. The centrifugal tub 24 can coast to a stop.

At the 55 minute mark the blister 334 bridges the reader openings V, J, and K.

This supplies a vacuum to the OFF actuator 322 through pipe 336 which causes the actuator 322 to open the master switch 80 and to connect the dump valve 338 to the atmospheric opening 340 instead of to the closed position 342.

The operations of the other programs shown in the chart of FIGURE 4 are obvious from the typical description of program No. 1. Program 8 starts at the beginning of the chart of FIGURE 4; Programs 2-7 start at positions 2-7 which are shown in the FIGURE 4 chart with circles around them.

The programs 1-8 may supply the following water temperatures for the "wash" and rinse operations which are suitable for various types of laundry as desired:

| Selector Position | Wash Temp. | Rinse Temp. |
|---|---|---|
| 1 | Cold | None. |
| 2 | Hot | Warm. |
| 3 | do | Cold. |
| 4 | Warm | Do. |
| 5 | Hot | Do. |
| 6 | Cold | Do. |
| 7 | Warm | Do. |
| 8 | do | Warm. |

Under certain conditions, features of this invention are also applicable to a somewhat horizontal action washing machine in which a clothes container or basket is somewhat horizontal and is located in a somewhat horizontal stationary tub. In such a washing machine, a washing action or agitating action may be produced by slow rotation of the basket while the liquid in the tub is at the selected upper level, such as is controlled by the upper water level valve 40. The spin or centrifuging action is produced by rotating the basket at a high centrifugal speed while the liquid in the tub is below the low level selected by the lower level valve 42.

The somewhat horizontal basket of such washing machine may be rotated in the same direction for both the agitation action and the centrifuging action. Under such conditions the motor 52 may be a two speed motor and the spin actuator 90 may control the high speed windings of such two speed motor, and the agitation actuator 98 may control the low speed windings of such two speed motor.

Such somewhat horizontal basket may have agitating means for such basket. Such agitating means may include baffle means attached to said basket and located in such basket.

Such somewhat horizontal action washing machines are well known and are therefore not herein illustrated.

While the form of the invention now preferred has been disclosed as required by the statutes, other forms may be used, all coming within the scope of the claims which follow.

What is claimed is:

1. A combination to control an automatic washing machine having a non-rotatable tub, a centrifugal container in said tub, agitating means for said container, a machine motor and transmission means for driving said container and agitating means at high and low speeds, and liquid introducing means for said tub, comprising:
   high and low speed controlling vacuum actuator means controlling said machine motor and transmission means to produce said high and low speeds;
   liquid controlling vacuum actuator means controlling said liquid introducing means;
   a vacuum distributing program means having vacuum transmitting line means connected to said vacuum actuator means;
   upper water level valve means connected to said tub and controlling said liquid controlling vacuum actuator means and said vacuum distributing program means;
   and lower water level valve means connected to said tub and controlling said high and low speed controlling vacuum actuator means.

2. A combination according to claim 1, in which said vacuum distributing program means includes a timer motor for operating said vacuum distributing program means, and in which said upper water level valve means controls said timer motor to prevent operation of said timer motor when the level of liquid in said tub is below a filled level to which said upper water level valve means is responsive.

3. A combination according to claim 2 in which said vacuum distributing program means also includes a vacuum producing means, a bypass switch and a bypass switch actuator means and in which said upper water level valve means also controls said bypass switch actuator means to open said bypass switch when the level of liquid in said tub is below such filled level.

4. A combination according to claim 1 in which said lower water level valve means controls said high and low speed controlling vacuum actuator means to prevent said motor and transmission means from driving said container and agitating means at said high speeds when the level of the liquid in said tub is above the liquid level to which said lower water level valve means is responsive.

5. A combination according to claim 4 in which said high and low speed controlling vacuum actuator means includes a speed control actuator, an agitator speed regulator and a centrifugal speed regulator.

6. A combination according to claim 5 in which said speed regulators each includes a casing having a diaphragm dividing said casing into a regulated vacuum chamber and an atmospheric pressure chamber, said regulated vacuum chamber having an opening connected to said program means and having a tube passing through said casing with a tube end adjacent said diaphragm and with the other end of said tube connectable by said program means to a vacuum producing means, and atmospheric air and vacuum bleed means in said diaphragm adjacent said first named tube end to maintain said regulated vacuum chamber at a regulated vacuum pressure.

7. A combination according to claim 5 in which said atmospheric air and vacuum bleed means includes a flat bottomed cup at said first named tube end, a compression spring surrounding said tube and having a spring end engaging said cup, said cup covering and uncovering an opening in said diaphragm adjacent said cup.

8. A combination according to claim 7 in which a manually adjustable compression spring in said atmospheric pressure chamber presses against said diaphragm to regulate the vacuum maintained in said regulated vacuum chamber.

9. In combination:
   a non-rotatable tub;
   a centrifugal container in said tub;
   agitating means for said container;
   a motor for driving said container and agitating means;
   a rotation controller for said motor having an agitation rotation adjustment means and a centrifugal rotation adjustment means;
   agitation and centrifugal vacuum actuator means to actuate said agitation rotation adjustment means and said centrifugal rotation adjustment means;
   a variable speed transmission means connecting said motor with said centrifugal container and agitating means to produce relatively high and low centrifugal speeds and agitation speeds;
   variable speed vacuum actuator means to cause said variable speed transmission to produce said relatively high and low centrifugal speeds and agitation speeds;
   liquid introducing means for said tub;
   liquid valve means controlling said liquid introducing means;
   liquid valve vacuum actuating means for said liquid valve means;
   upper water level valve means connected to said tub and controlling said liquid valve vacuum actuating means;
   and a lower water level valve means having an actuating setting and connected to said tub and controlling said variable speed vacuum actuator means to prevent production of said high speeds by said transmission means when the water level in said tub is above said setting and permitting production of said high speeds when said water level is below said setting.

10. A combination according to claim 9 in which said agitation rotation adjustment means causes said motor to rotate in one direction and said centrifugal rotation adjustment causes said motor to rotate in the other direction.

11. A combination according to claim 9 in which said variable speed transmission includes a pulley connected to said centrifugal container and agitating means, another pulley connected to said motor, a belt connecting said pulleys, one of said pulleys being a variable diameter pulley.

12. A combination according to claim 9 in which said variable speed vacuum actuator means includes:
   a speed control vacuum actuator to adjust said variable speed transmission to produce variable speeds;
   a centrifugal speed vacuum regulator to produce a regulated vacuum in said speed control vacuum actuator;
   and an agitation speed vacuum regulator to produce a regulated vacuum in said speed control vacuum actuator.

13. A combination according to claim 9, including:
   a reading head with reader opening;
   a channeled control member with atmospheric air introducing openings passing over said reading head to produce a vacuum transfer between various ones of said reader openings;
   and to introduce atmospheric air into various ones of said reader openings;
   vacuum producing means;
   vacuum transmitting lines connecting various ones of said reader openings with said vacuum actuating means and said vacuum producing means;
   and a timer motor moving said channeled member over said reading head.

14. A combination to control an automatic washing machine having a non-rotatable tub, a centrifugal container in said tub, agitating means for said container, and a machine motor for driving said container and agitating means comprising:
- a rotation controller for said motor having an agitation rotation adjustment means and a centrifugal rotation adjustment means;
- an agitation and centrifugal vacuum actuator means to actuate said agitation rotation adjustment means and said centrifugal rotation adjustment means;
- a variable transmission means connecting said motor with said centrifugal container and agitating means to produce relatively high and low centrifugal speeds and agitation speeds;
- variable speed vacuum actuator means to cause said variable speed transmission to produce said relatively high and low centrifugal speeds and agitation speeds;
- liquid introducing means for said tub;
- liquid valve means controlling said liquid introducing means;
- liquid valve vacuum actuating means for said liquid valve means;
- upper water level valve means connected to said tub and controlling said liquid valve vacuum actuating means;
- a lower water level valve means having an actuating setting and connected to said tub and controlling said variable speed vacuum actuator means to prevent production of said high speeds by said transmission means when the water level in said tub is above said setting and permitting production of said high speeds when said water level is below said setting;
- a reading head with reader openings;
- a channeled control member with atmospheric air introducing openings passing over said reading head to produce a vacuum transfer between various ones of said reader openings and to introduce atmospheric air into various ones of said reader openings;
- vacuum producing means;
- vacuum transmitting lines connecting various ones of said reader openings with said vacuum actuating means and said vacuum producing means;
- and a timer motor moving said channeled member over said reading head.

15. A combination according to claim 14 in which said agitation rotation adjustment means causes said machine motor to rotate in one direction and said centrifugal adjustment causes said machine motor to rotate in the other direction.

16. A combination according to claim 14 in which said variable speed transmission includes a pulley connected to said centrifugal container and agitating means, another pulley connected to said machine motor, a belt connecting said pulleys, one of said pulleys being a variable diameter pulley.

17. A combination according to claim 14 in which said variable speed vacuum actuator means includes:
- a speed control vacuum actuator to adjust said variable speed transmission to produce variable speeds;
- a centrifugal speed vacuum regulator to produce a regulated vacuum in said speed control vacuum actuator;
- and an agitation speed vacuum regulator to produce a regulated vacuum in said speed control vacuum actuator.

References Cited by the Examiner

UNITED STATES PATENTS

| | | | |
|---|---|---|---|
| 3,111,017 | 11/1963 | Searle | 68—24 |
| 3,112,630 | 12/1963 | Anderson et al. | 68—12 |
| 3,256,692 | 6/1966 | Rice et al. | 68—12 X |

WILLIAM I. PRICE, *Primary Examiner.*